United States Patent
Angel et al.

(10) Patent No.: US 11,732,829 B1
(45) Date of Patent: Aug. 22, 2023

(54) CORRUGATED HOSE WITH BAYONET CONNECTOR

(71) Applicants: Bruce Andrew Angel, Stokesdale, NC (US); Austin Hugh McGugan, Greensboro, NC (US)

(72) Inventors: Bruce Andrew Angel, Stokesdale, NC (US); Austin Hugh McGugan, Greensboro, NC (US)

(73) Assignee: Camco Manufacturing, LLC, Greensboro, NC (US)

( * ) Notice: Subject to any disclaimer, the term of this patent is extended or adjusted under 35 U.S.C. 154(b) by 110 days.

(21) Appl. No.: 17/453,507

(22) Filed: Nov. 4, 2021

(51) Int. Cl.
  *F16L 37/107* (2006.01)
  *F16L 11/15* (2006.01)
  *F16L 25/00* (2006.01)
  *B60R 15/02* (2006.01)

(52) U.S. Cl.
  CPC ............ *F16L 37/107* (2013.01); *F16L 11/15* (2013.01); *F16L 25/0045* (2013.01); *B60R 15/02* (2013.01)

(58) Field of Classification Search
  CPC ....... F16L 37/24; F16L 37/248; F16L 37/107; F16L 25/0036; F16L 25/0045; F16L 33/26; Y10S 285/903; E03F 1/008
  See application file for complete search history.

(56) References Cited

U.S. PATENT DOCUMENTS

| | | | | |
|---|---|---|---|---|
| 4,225,162 A * | 9/1980 | Dola | ...................... | F16L 33/26 285/251 |
| 4,558,889 A * | 12/1985 | Gans | ..................... | F16L 37/084 285/275 |
| 4,909,547 A * | 3/1990 | Guy | ..................... | F16L 25/0036 285/903 |
| 5,417,460 A * | 5/1995 | Lunder | ................... | F16L 33/08 285/903 |
| 5,667,251 A * | 9/1997 | Prest | ..................... | F16L 37/248 285/376 |
| 5,971,438 A * | 10/1999 | Johnson | ................... | E03F 1/008 285/179 |
| 7,597,119 B2 * | 10/2009 | Boettner | ................. | E03F 1/008 138/119 |
| 8,465,059 B1 * | 6/2013 | Price | ....................... | F16L 27/08 285/278 |
| 11,306,472 B2 * | 4/2022 | Lin | ......................... | F04D 9/041 |

* cited by examiner

*Primary Examiner* — Zachary T Dragicevich
*Assistant Examiner* — Alexander T Rufrano
(74) *Attorney, Agent, or Firm* — Tuggle Duggins P.A.; Blake P. Hurt (57) ABSTRACT

A corrugated hose particularly suited for use for discharge of waste water from an RV is disclosed herein, the corrugated hose having a plurality of accordion-type corrugations and a proximal end, the proximal end having a cylindrical section and a circumferential ridge located between the accordion-type corrugations and the proximal end of the corrugated hose; wherein the circumferential ridge is sandwiched in close frictional contact between a locking ring and a bayonet connector.

20 Claims, 6 Drawing Sheets

CORRUGATED HOSE WITH BAYONET CONNECTOR

FIELD OF THE INVENTION

The invention herein pertains to a hose accessory, and more particularly pertains to a connector for a corrugated hose for use in the RV or boating industry.

DESCRIPTION OF THE PRIOR ART AND OBJECTIVES OF THE INVENTION

Recreational vehicles are extremely popular and, as the term is generally understood and used herein, includes a wide range of motor vehicles and trailers that include living accommodations. The term recreational vehicle ("RV") includes motorhomes, campervans, travel trailers, pop-up campers and other vehicles that are either self-propelled or which can be towed behind another vehicle, typically a car or truck. These RV's are primarily used for vacations, camping trips, sports outings or other circumstances where temporary living accommodations are required. It should be noted that the accessories typically used in the RV market are often used in other areas as well, for example in the boating community or in camping.

Many of these RVs are very well-appointed and include living space, bedroom space, as well as kitchen and bathroom facilities. Some even come equipped with laundry facilities. Larger RVs may also contain an on-board water storage and/or a connection to allow use of a water supply at a campsite, RV park, or the like. All RVs that have a sink, shower and/or toilet need to have at least one storage tank to collect and hold the waste water. Separate tanks are often used for "grey water" (collected from sinks and showers) and "black water" (collected from the toilet). Waste water in the tank is then periodically emptied into a dump station provided at the campground, RV park, or other location. Emptying the waste water from the storage tank involves connecting a flexible hose at one end to the tank and at the other end to the inlet for the dump station, or to a portable holding tank that is then used to transport the waste to the dumping station.

To connect the waste disposal hose to the outlet valve of a recreational vehicle, the inlet end of a typical waste disposal hose may include a so-called female bayonet coupling. The female bayonet coupling engages a male bayonet coupling on the outlet valve for the waste storage tank. The male bayonet coupling includes a cylindrical pipe with a plurality of spaced protrusions, knobs, or buttons which outwardly extend from the outer diameter of the pipe. The female bayonet coupling typically includes a plurality of circumferentially extending and tapered blades which define a plurality of circumferentially extending channels or slots. When the one or more buttons on the pipe are received in the corresponding slot(s) and the female bayonet coupling is rotated, the tapered blades cooperate with the buttons and cause the bayonet coupling to be pressed against the end of the pipe. A resilient gasket may be compressed between the end of the outlet valve and the bayonet coupling, and substantially prevents waste and odorous gasses from escaping. The exit end of a typical black water disposal hose may include an elbow or other fitting for insertion into or connection with an inlet of a waste disposal facility.

Though known waste disposal hoses and couplings are generally satisfactory for transferring waste from a recreational vehicle black water storage tank to a dump station, they can be improved. Known waste disposal hoses typically include a length of flexible corrugated pipe or tubing that can be bent, extended, and contracted to adapt to various relative positions of an outlet valve and a dump station inlet. The fittings and couplings provided on such hoses typically are non-movably attached to the ends of the hose. However, when attaching a rigid connection fitting to a flexible hose with corrugations, it can be problematic to achieve a robust and leak-free connection.

U.S. Pat. No. 8,465,059, the disclosure of which is incorporated herein by reference in its entirety, teaches a swivel connection for a corrugated hose having a collar with a plurality of spirally arranged internal threads. These internal threads engage with the spirally arranged external corrugations on the hose to form a screw fit connection between the end of the corrugated hose and the bayonet coupling. While that embodiment of the connector disclosed in the '059 patent works well, it is only suitable for use with hoses that have a spiral corrugation pattern. For corrugated hoses that do not have such a pattern, it is common to attach the hose to the coupling using an external clamp, such as the hose clamp shown in FIG. 1 of the '059 patent.

Using external clamps is an inexpensive option but suffers from many drawbacks. For example, the clamp can rust or loosen over time and it is difficult to achieve a consistent clamping pressure on the hose, resulting in leaks. Thus, in view of the problems and disadvantages associated with prior art devices, the present invention was conceived and one of its objectives is to provide a simple, leak-free hose connector for a corrugated hose.

It is another objective of the present invention to provide a leak free connector for a corrugated sewer hose used on recreational vehicles.

It is yet another objective of the present invention to provide a connector for a corrugated hose that provides a swivel connection.

It is a further objective of the present invention to provide a connector for a corrugated hose, wherein the connector includes a bayonet swivel, a slip swivel, and a locking ring to engage the corrugated hose.

Various other objectives and advantages of the present invention will become apparent to those skilled in the art as a more detailed description is set forth below.

SUMMARY OF THE INVENTION

The aforesaid and other objectives are realized by providing a connector for a corrugated hose which includes a bayonet swivel, a slip swivel, and a locking ring. The bayonet swivel is connected to the slip swivel to form a bayonet coupling. The slip swivel has a hollow tubular section with an outer circumferential flange spaced from the hollow tubular section to form a circumferential channel. A proximal end of a corrugated hose has a smooth exterior cylindrical section which is partially received within the circumferential channel on the slip swivel. A ridged projection on the proximal end of the corrugated hose butts up against a terminal edge of the circumferential flange. A locking ring is disposed over the proximal end of the corrugated hose and engages an opposite face of the ridged projection, whereby the ridged projection is sandwiched between the locking ring and the circumferential flange on the slip swivel.

DETAILED DESCRIPTION OF THE PREFERRED EMBODIMENT AND OPERATION OF THE INVENTION

Various exemplary embodiments of the present disclosure are described below. Use of the term "exemplary" means illustrative or by way of example only, and any reference herein to "the invention" is not intended to restrict or limit the invention to exact features or step of any one or more of the exemplary embodiments disclosed in the present specification. References to "exemplary embodiment", "one embodiment", "an embodiment", "various embodiments", and the like may indicate that the embodiment(s) of the invention so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present invention is described more fully hereinafter with reference to the accompanying figures, in which one or more exemplary embodiments of the invention are shown. Like numbers used herein refer to like elements throughout. The invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the invention, and any and all equivalents thereof. Moreover, many embodiments such as adaptations, variations, modifications, and equivalent arrangements will be implicitly disclosed by the embodiments described herein and fall within the scope of the instant invention.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has previously been reduced to practice or that any testing has been performed. Likewise, unless stated otherwise, use of verbs in the past tense (present perfect or preterit) is not intended to indicate or imply that the invention has previously been reduced to practice or that any testing has been performed.

Turning now to the Figures, the corrugated hose connector assembly of the present disclosure is primarily useful in making a fluid-tight connection between a corrugated hose and a male bayonet coupling typically used on the discharge outlet for waste water storage tanks on recreational vehicles. While the embodiments illustrated in FIGS. 1-6 and described herein show a female bayonet coupling, it is to be understood that other couplings may be used to provide a mating connection with the outlet to which the hose is to be connected.

Figure 1:
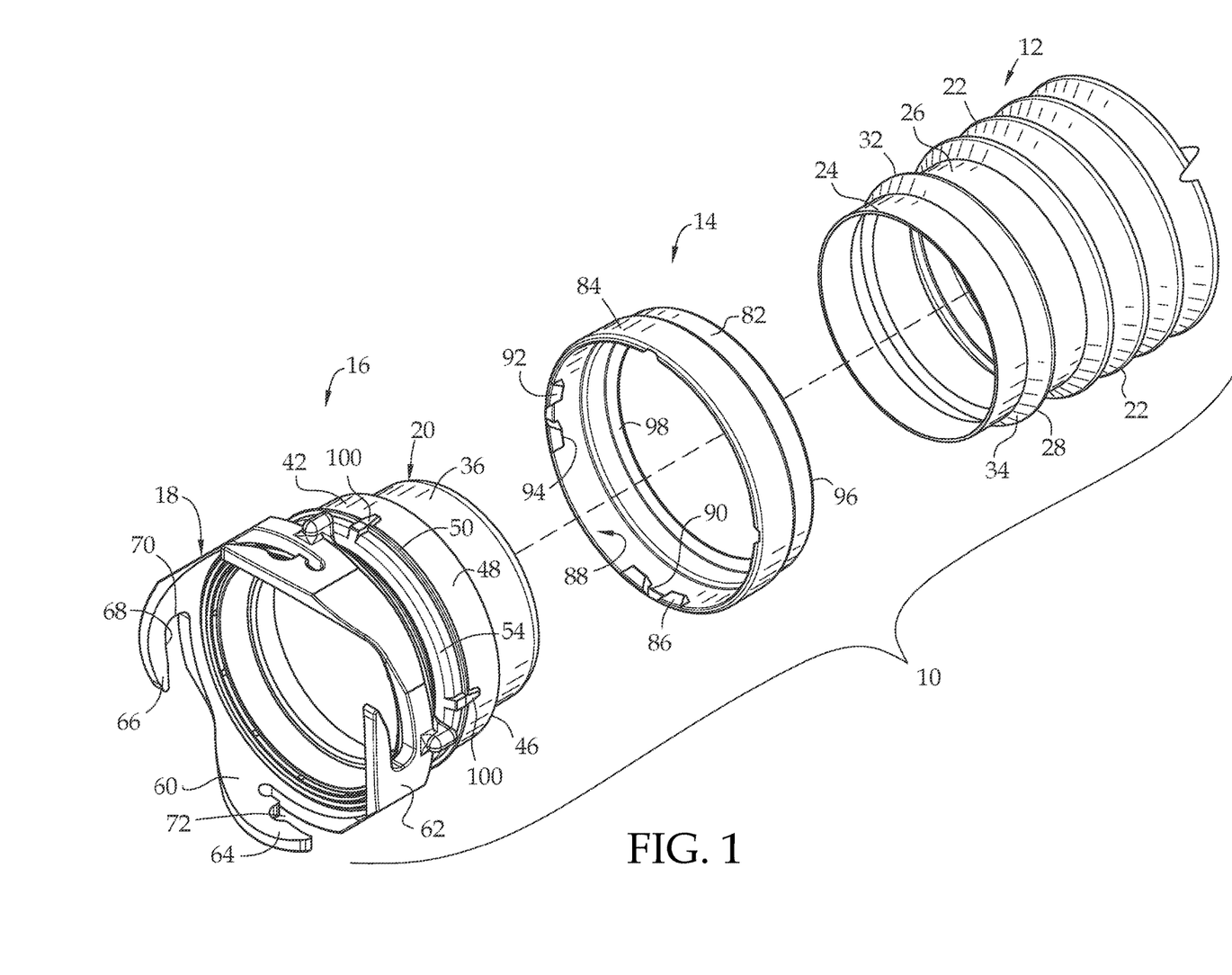
FIG. 1 is an exploded perspective view of an embodiment of the corrugated hose connector of the present disclosure.

With reference now to the Figures, a preferred embodiment of the corrugated hose end connector is illustrated therein. The corrugated hose end connector such as seen in FIG. 1, generally designated as 10, preferably includes one or more of a corrugated hose 12, a locking ring 14, and a female bayonet swivel coupling 16. One embodiment of female bayonet coupling 16 includes a female bayonet swivel 18, and a male slip swivel 20.

Figure 3:
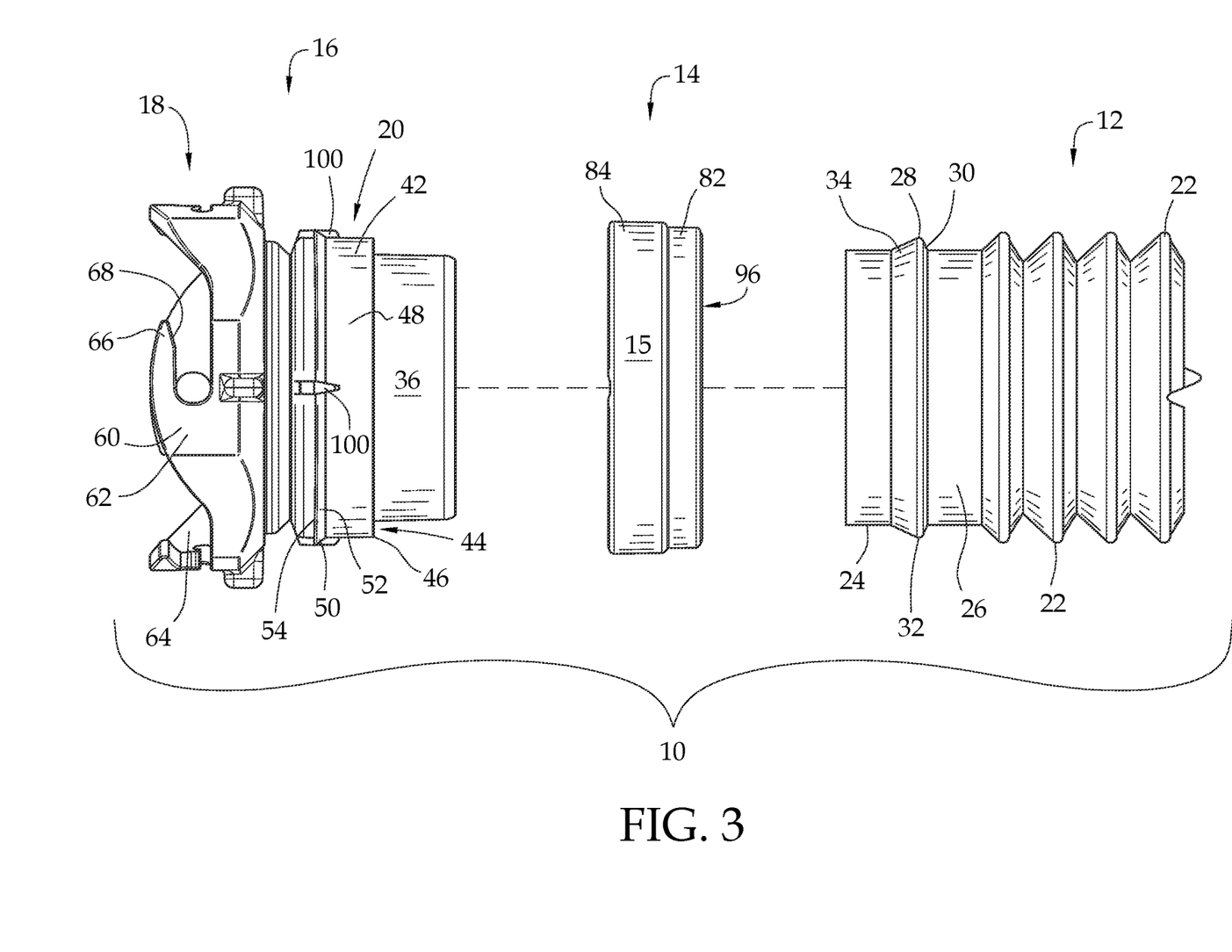
FIG. 3 is an exploded side elevation view of an embodiment of the corrugated hose end connector of the disclosure.

Corrugated hose 12 as seen in FIGS. 1 and 3 may define a plurality of accordion-type corrugations 22 that enable the hose 12 to flex in multiple directions as well as to expand or contract in length. The proximal end 24 of corrugated hose 12 preferably includes a cylindrical section 26 with a circumferential ridge or projection 28. The circumferential ridge 28 is shown located in about the general longitudinal center of the cylindrical section 26.

With particular reference to FIG. 3, the circumferential ridge 28 preferably defines a first sloped surface 30 that rises upwardly away from the cylindrical section 26 at a first angle to an apex point 32. From the apex point 32, the preferred embodiment of the circumferential ridge 28 descends back to the cylindrical section 26 at a second angle, forming a second sloped surface 34. The angle of the first sloped surface 30 may be steeper than the angle of the second sloped surface 34, whereby circumferential ridge 28 has an asymmetric shape. Stated differently, the slope of second sloped surface 34 may be flatter than the slope of first sloped surface 30.

Figure 6:
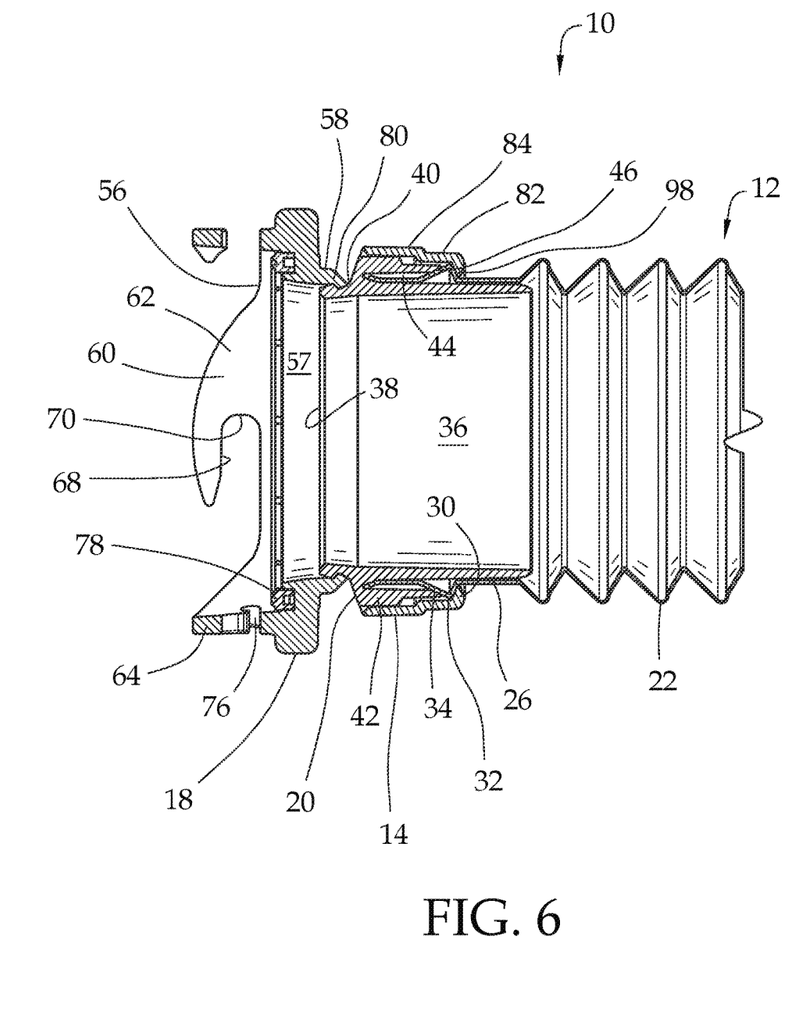
FIG. 6 is a cross-sectional view of an embodiment of the corrugated hose end connector of the disclosure, as seen along lines and arrows 6-6 in FIG. 5.

The female bayonet swivel coupling 16 may be comprised of the bayonet swivel 18 and the slip swivel 20, which are ideally joined together to form a swivel connection. The slip swivel 20 may include a longitudinal tubular section 36 having an outer diameter sized so that proximal end 24 of corrugated hose 12 is configured to fit over the tubular section 36, as shown in FIG. 6. The slip swivel 20 preferably defines a proximal end 38 located opposite the tubular section 36. An outer circumferential groove 40 is preferably located adjacent to the proximal end 38 of slip swivel 20. A preferred circular flange or collar 42 is located adjacent to the circumferential groove 40 and is spaced from the outer diameter of the tubular section 36, whereby a circumferential channel 44 is formed between the circular collar 42 and the tubular section 36. The opening of channel 44 is oriented away from the proximal end 38 of slip swivel 20. With continued reference to FIG. 6, the circumferential channel 44 is preferably sized and shaped to receive therein proximal end 24 of the cylindrical section 26 of corrugated hose 12, with terminal edge 46, also seen in FIG. 1 of collar 42 butting up against the second sloped surface 34 of ridge 28 when the proximal end 24 of corrugated hose 12 is fully seated within the channel 44.

As seen at least in FIGS. 1 and 3, the exterior surface 48 of collar 42 may have an annular projection 50 forming a lip around the collar 42 at a location between the proximal end 38 of slip swivel 20 and the terminal edge 46 of collar 42. The annular projection 50 preferably defines a sloped surface 52 on the face closest to the terminal edge 46 of collar 42 and a flat surface 54 on the face closest to the proximal end 38 of the slip swivel 20. The flat surface 54 forms an angle of about 90 degrees (+/−5 degrees) relative to the exterior surface 48 of collar 42.

Figure 2:
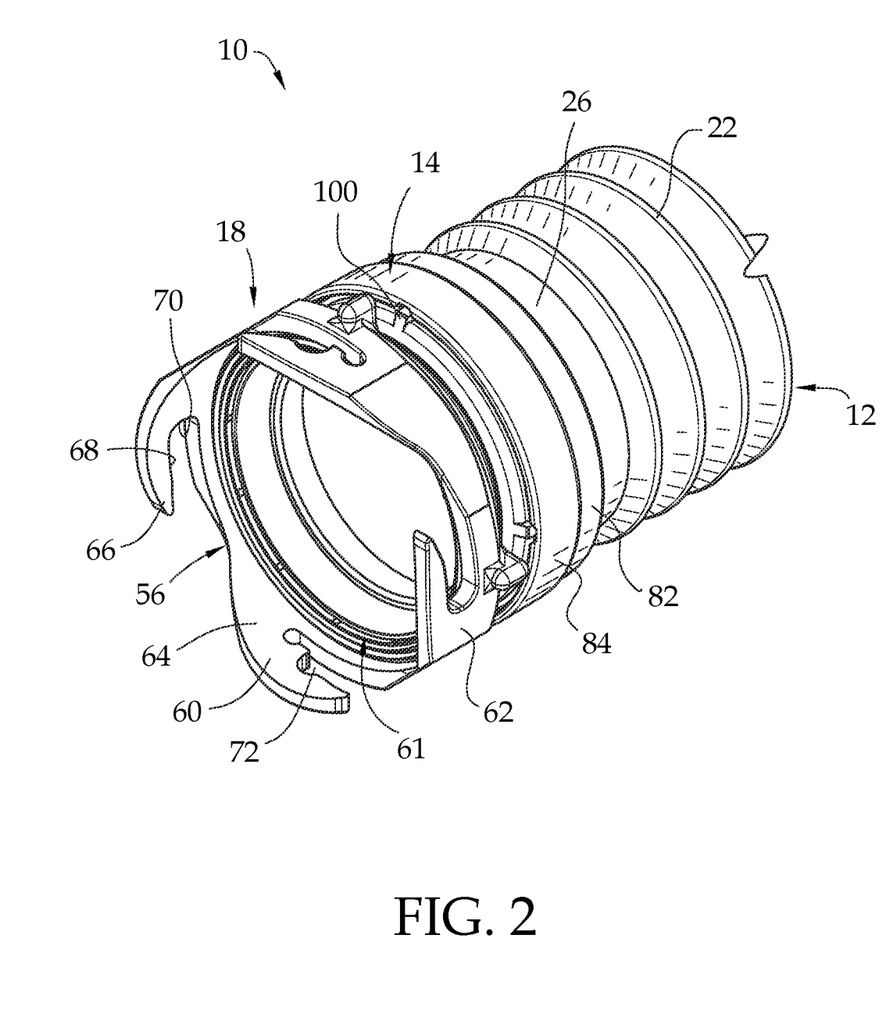
FIG. 2 is a perspective view of an embodiment of the corrugated hose end connector of the present disclosure, shown full assembled.
Figure 4:
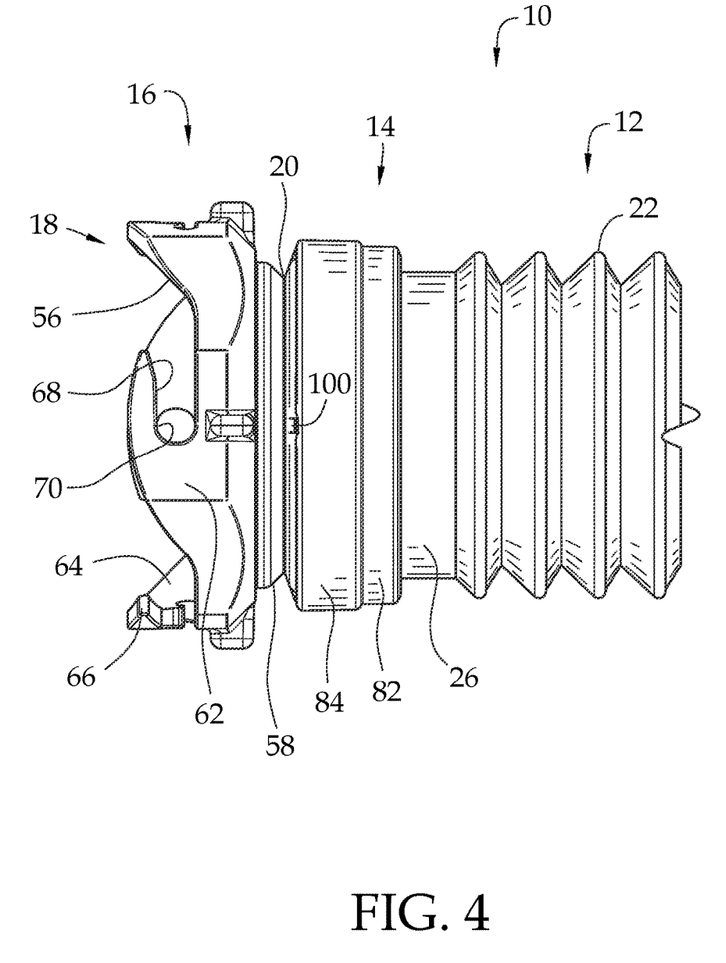
FIG. 4 is a side elevation view of an embodiment of the corrugated hose end connector of the present disclosure, shown full assembled.
Figure 5:
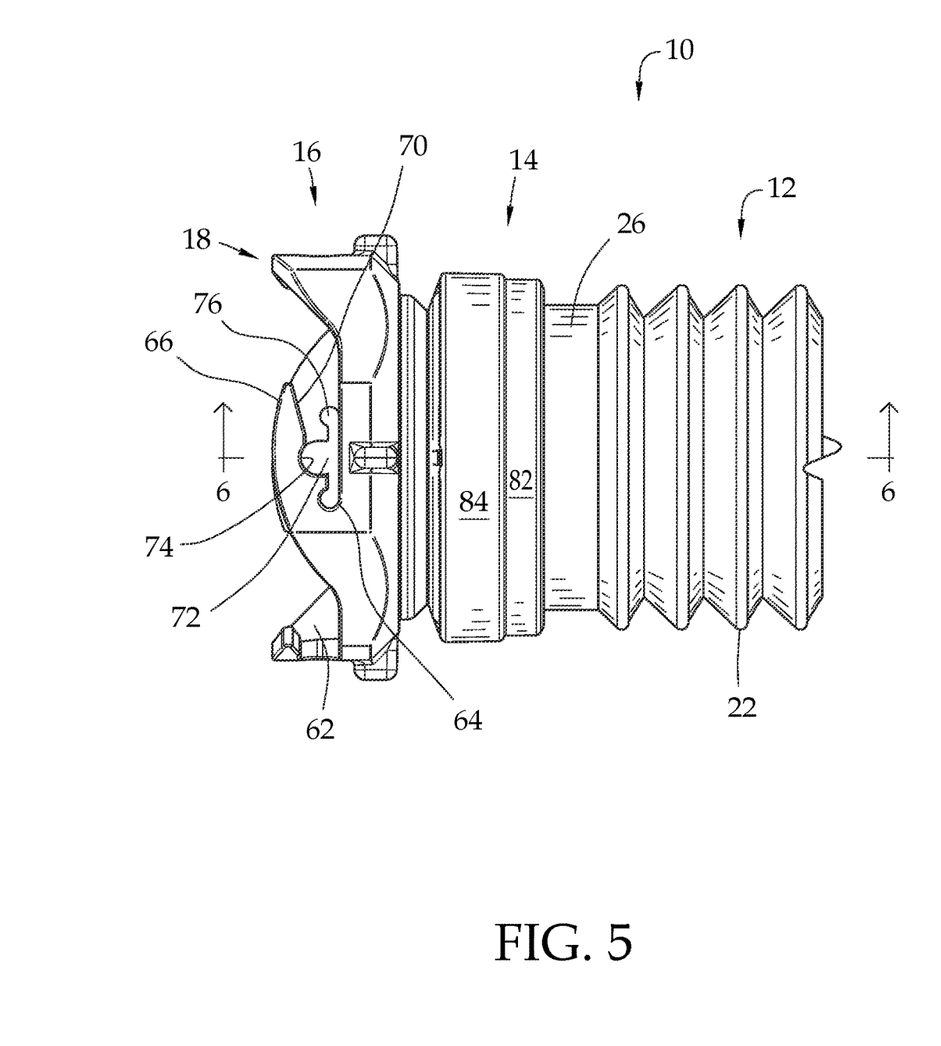
FIG. 5 is a top plan view of an embodiment of the corrugated hose end connector of the present disclosure, shown full assembled.

Bayonet swivel 18 preferably comprises a generally tubular-shaped member 57 with a proximal end 56 and a distal end 58 as also seen in FIG. 4. The proximal end 56 is provided with a plurality of blades 60 spaced around the perimeter opening 61 as seen in FIGS. 2, 4, and 5. Blades 60 include opposing guide blades 62, 62 and opposing locking blades 64, 64. The guide blades 62, 62 are disposed generally 180 degrees from one another and about 90 degrees from the adjacent locking blade 64, such that the locking blades 64 and guide blades 62 alternate about the perimeter opening 61 at the proximal end 56 of the bayonet swivel 18. Each of the blades 60 includes a tapered end 66 and a slotted opening 68. The slotted opening 68 of the locking blades 64 has a different configuration from that of the slotted opening 68 of the guide blades 62. In particular, the slotted opening 68 of guide blades 62 has a rounded end 70 (see FIGS. 2 and 4), whereas the slotted opening 68 in the locking blade 64 has a terminal end 72 with a bi-lobe configuration with a large lobe 74 and a smaller lobe 76 (see FIG. 5).

The blades 60 and the slotted openings 68 are positioned to engage with a plurality of lugs on a typical male bayonet coupling (not shown) typically found on an RV (not shown). The male bayonet coupling is typically stationary so that upon rotation of the female bayonet swivel 18, the female bayonet coupling 16 is drawn tight against the male bayonet coupling. The female bayonet swivel 18 has a gasket 78 seated within a grooved opening near the distal end 58. As the female bayonet coupling 16 is drawn against the male bayonet coupling, the gasket 78 is compressed, thus providing a fluid tight seal.

With particular reference to FIG. 6, the distal end 58 of bayonet swivel 18 preferably includes an inwardly projecting annular lip 80 that is configured to fit within the circumferential groove 40 on the slip swivel 20. In this arrangement, the slip swivel 20 and bayonet swivel 18 may rotate relative to one another, yet still remain firmly connected. A leading edge on the proximal end 38 of slip swivel 20 is preferably tapered, as is a leading edge on the distal end 58 of the bayonet swivel 18. These tapered edges facilitate joining of the slip swivel 20 to the bayonet swivel 18 by pressing the distal edge 58 of the bayonet swivel 18 toward the proximal edge 38 of the slip swivel 20, causing the annular lip 80 on the bayonet swivel 18 to expand outwardly and then snap into position within the annular groove 40 on the slip swivel 20.

The preferred embodiment of locking ring 14 as seen in the Figures is a circular member 15 with a small diameter segment 82 and a large diameter segment 84 (FIG. 4), lending to the locking ring defining a stepped configuration. The large diameter segment 84 may include one or more, and preferably a plurality of lugs 86 (FIG. 1) arranged on the interior surface 88 thereof. The lugs 86 may be arranged in pairs, with each pair being located approximately 90 degrees apart from one another; i.e., at the 12 o'clock, 3 o'clock, 6 o'clock and 9 o'clock positions. Each pair of lugs 86 preferably comprises two lugs separated from one another by a predetermined space 90. As seen in FIG. 1, the lugs 86 may define a leading surface 92 that is angled to form a sloped surface and a trailing surface 94 that is flat and generally perpendicular to the inner surface 88 of the large diameter segment 84 of the locking ring 14.

The small diameter segment 82 of locking ring 14 has an inward turned rear edge 96 forming an internal lip 98 as also seen in FIG. 6. The diameter of the internal lip 98 is preferably closely matched with the diameter of the cylindrical section 26 on the proximal end 24 of the corrugated hose 12.

With reference made to FIGS. 1, 3 and 6, a method of assembly of the corrugated hose end connector is also disclosed herein. As one of the initial steps, the slip swivel 20 and bayonet swivel 18 are attached to one another as described above to form the bayonet swivel coupling 16. The locking ring 14 is preferably placed over the cylindrical section 26 of the corrugated hose 12, such that the internal lip 98 on the small diameter segment 82 of the locking ring 14 is disposed behind the first sloped surface 30 of the circumferential projection 28. It is intended to compress the proximal end 24 of the corrugated hose 12 slightly to accomplish this step because the circumferential projection 28 defines a larger diameter than the diameter of the internal lip 98. Once the locking ring is in place, the proximal end 24 of the corrugated hose 12 is preferably placed over the tubular section 36 of slip swivel 20 and within the channel 44 formed between the tubular section 36 and circular collar 42 and the terminal edge 46 of circular collar 42 abuts the second sloped surface 34 of circumferential ridge 28.

Once the proximal end 24 of cylindrical section 26 is seated within the channel 44, the locking ring may be slid toward the bayonet swivel coupling 16 and rotated such that the spaces 90 between adjacent lugs 86 on the inner surface 88 of the large diameter segment 84 is aligned with the plurality of tabs 100 located on the exterior surface 48 of the circular collar 42. As the locking ring 14 is pushed toward and onto the bayonet swivel coupling 16, the angled leading surfaces 92 on the lugs 86 will contact the sloped surface 52 (FIG. 3) on the annular projection 50, resulting in a tight frictional engagement causing a slight expansion of the diameter of the large diameter segment 84.

Once the angled leading surface 92 and sloped surface 52 are no longer in contact, the diameter of the large diameter segment 84 will revert to its original dimension and the flat surface 94 of the lugs 86 will be in contact with flat surface 54 of the annular projection 50. In addition, the internal lip 98 on the rear edge 96 of the locking ring 14 will be seated against the first sloped surface 30 (FIG. 3) of the circumferential ridge 28 on the corrugated hose 12. The disposition of the tabs 100 between the adjacent lugs 86 will prevent the locking ring 14 from rotating relative to the slip swivel 20.

The illustrations and examples provided herein are for explanatory purposes and are not intended to limit the scope of the appended claims.

We claim:
1. A corrugated hose with bayonet connector comprising: a length of hose, a bayonet coupling and a locking ring; the length of hose defining a plurality of accordion-shaped corrugations and a proximal end, the proximal end including a cylindrical section and a circumferential ridge, the circumferential ridge positioned between the plurality of accordion-shaped corrugations and the proximal end; wherein the bayonet coupling includes a longitudinal tubular section and a proximal end located opposite the longitudinal tubular section, the bayonet coupling comprises a circumferential groove positioned adjacent to the proximal end of the bayonet coupling; the bayonet coupling further comprises a circular collar located adjacent to the circumferential groove and spaced from an outer surface of the longitudinal tubular section, whereby a circumferential channel is formed between the circular collar and the longitudinal tubular section, and wherein the circumferential ridge is frictionally compressed between the locking ring and the bayonet coupling.

2. The corrugated hose with bayonet connector of claim 1, wherein the bayonet coupling comprises a bayonet swivel and a slip swivel, wherein an annular lip on the bayonet swivel is disposed within the circumferential groove, and whereby the bayonet swivel is configured to rotate relative to the slip swivel.

3. The corrugated hose with bayonet connector of claim 1, wherein the bayonet coupling comprises a bayonet swivel and a slip swivel, wherein the bayonet swivel further comprises a generally tubular-shaped member with a proximal end and a distal end; wherein the proximal end of the bayonet swivel is provided with a plurality of blades spaced around a perimeter opening, the plurality of blades defining one or more guide blades and one or more locking blades.

4. The corrugated hose with bayonet connector of claim 1, wherein the bayonet coupling comprises a bayonet swivel and a slip swivel, wherein the bayonet swivel further comprises a generally tubular-shaped member with a proximal end and a distal end; wherein the proximal end of the bayonet swivel is provided with a plurality of blades spaced around a perimeter opening, the plurality of blades comprising guide blades and locking blades, and wherein the guide blades are disposed about one hundred eighty degrees from one another and the locking blades are disposed from one another, such that the locking blades and the guide blades alternate about the perimeter opening at the proximal end of the bayonet swivel.

5. The corrugated hose with bayonet connector of claim 1, wherein the bayonet coupling further comprises a bayonet swivel and a slip swivel, wherein the bayonet swivel further comprises a generally tubular-shaped member with a proximal end and a distal end; wherein the proximal end of the bayonet swivel is provided with a plurality of blades spaced around a perimeter opening, the plurality of blades comprising guide blades and locking blades; and wherein each of the plurality of blades defines a tapered end and a slotted opening.

6. The corrugated hose with bayonet connector of claim 1, wherein the bayonet coupling comprises a bayonet swivel and a slip swivel, wherein the bayonet swivel further comprises a generally tubular-shaped member with a proximal end and a distal end; wherein the proximal end of the bayonet swivel is provided with a plurality of blades spaced around a perimeter opening, the plurality of blades comprising guide blades and locking blades; the guide blades defining a slotted opening with a rounded end; and the locking blades defining a slotted opening with a terminal end defining a bi-lobe configuration with a large lobe opening and a small lobe opening.

7. The corrugated hose with bayonet connector of claim 1, wherein the bayonet coupling further comprises a gasket.

8. The corrugated hose with bayonet connector of claim 1, wherein the bayonet coupling comprises a bayonet swivel and a slip swivel, and wherein the slip swivel defines the longitudinal tubular section with an outer diameter sized so that the proximal end of the hose fits over the longitudinal tubular section.

9. The corrugated hose with bayonet connector of claim 1, wherein the bayonet coupling comprises a bayonet swivel and a slip swivel, wherein the slip swivel defines the longitudinal tubular section and a proximal end located opposite the longitudinal tubular section, the slip swivel further comprising the circumferential groove positioned adjacent to the proximal end of the slip swivel; the slip swivel further comprising the circular collar located adjacent to the circumferential groove and spaced from the outer surface of the longitudinal tubular section, and whereby the circumferential channel is formed between the circular collar and the longitudinal tubular section.

10. The corrugated hose with bayonet connector of claim 1, wherein the bayonet coupling comprises a bayonet swivel and a slip swivel, wherein the slip swivel defines the longitudinal tubular section and a proximal end located opposite the longitudinal tubular section, the slip swivel further comprising the circumferential groove located adjacent to the proximal end of the slip swivel; the slip swivel further comprising the circular collar located adjacent to the circumferential groove and spaced from the outer surface of the longitudinal tubular section, and the circular collar defining an exterior surface with an annular projection forming a lip around the circular collar at a location between the proximal end of the slip swivel and a terminal edge of the circular collar.

11. The corrugated hose with bayonet connector of claim 1,
wherein the bayonet coupling comprises a bayonet swivel and a slip swivel,
wherein the slip swivel defines the longitudinal tubular section and a proximal end located opposite the longitudinal tubular section,
the slip swivel further comprising the circumferential groove located adjacent to the proximal end of the slip swivel;
the slip swivel further comprising the circular collar positioned adjacent to the circumferential groove and spaced from the outer surface of the longitudinal tubular section,
the circular collar defining an exterior surface with an annular projection forming a lip around the circular collar at a location between the proximal end of the slip swivel and a terminal edge of the circular collar,
the annular projection defining a sloped surface on a face closest to the terminal edge of the circular collar and a flat surface on a face closest to the proximal end of the slip swivel; and
the flat surface forming an angle of about ninety degrees relative to the exterior surface of the circular collar.

12. The corrugated hose with bayonet connector of claim 1,
wherein the bayonet coupling comprises a bayonet swivel and a slip swivel,
wherein the slip swivel defines the longitudinal tubular section and a proximal end located opposite the longitudinal tubular section,
the slip swivel further comprising the circumferential groove located adjacent to the proximal end of the slip swivel;
the slip swivel further comprising the circular collar located adjacent to the circumferential groove and spaced from the outer surface of the longitudinal tubular section,
whereby the circumferential channel is formed between the circular collar and the longitudinal tubular section, and
wherein a portion of the cylindrical section of the length of hose is disposed within the circumferential channel.

13. The corrugated hose with bayonet connector of claim 1,
wherein the circumferential ridge forms a first sloped surface that rises upwardly away from the cylindrical section at a first angle to an apex point and a second sloped surface that descends from the apex point back to the cylindrical section at a second angle, and
wherein the slope of the first sloped surface is steeper than the slope of the second sloped surface.

14. The corrugated hose with bayonet connector of claim 1,
wherein the bayonet coupling comprises a bayonet swivel and a slip swivel,
wherein the slip swivel defines the longitudinal tubular section and a proximal end located opposite the longitudinal tubular section,
the slip swivel further comprising the circumferential groove located adjacent to the proximal end of the slip swivel;

the slip swivel further comprising the circular collar positioned adjacent to the circumferential groove and spaced from the outer surface of the longitudinal tubular section,
whereby the circumferential channel is formed between the circular collar and the longitudinal tubular section;
the circular collar defining an exterior surface with an annular projection forming a lip around the circular collar at a location between the proximal end of the slip swivel and a terminal edge of the circular collar,
the annular projection forming a sloped surface on a face closest to the terminal edge of the circular collar and a flat surface on a face closest to the proximal end of the slip swivel;
the flat surface defining an angle of about ninety degrees relative to the exterior surface of the circular collar;
wherein a portion of the cylindrical section of the hose is disposed within the circumferential channel;
wherein the circumferential ridge forms a first sloped surface that rises upwardly away from the cylindrical section at a first angle to an apex point and a second sloped surface that descends from the apex point back to the cylindrical section at a second angle;
wherein the slope of the first sloped surface is steeper than the slope of the second sloped surface; and
wherein the terminal edge of the circular collar is in contact with the second sloped surface of the circumferential ridge.

15. The corrugated hose with bayonet connector of claim 1,
wherein the locking ring comprises a circular member with a small diameter segment and a large diameter segment, and
wherein the large diameter segment defines a plurality of lugs arranged on an interior surface thereof.

16. The corrugated hose with bayonet connector of claim 1,
wherein the locking ring comprises a circular member with a small diameter segment and a large diameter segment,
the large diameter segment defining a plurality of lugs arranged on an interior surface thereof,
wherein the plurality of lugs are arranged in pairs, with each pair being located about ninety degrees apart from one another;
wherein each pair of lugs comprises two lugs separated from one another by a space; and
wherein each lug has a leading surface that is angled to form a sloped surface and a trailing surface that is flat and generally perpendicular to the interior surface of the large diameter segment of the locking ring.

17. The corrugated hose with bayonet connector of claim 1,
wherein the bayonet coupling comprises a bayonet swivel and a slip swivel,
wherein the slip swivel defines the longitudinal tubular section and a proximal end located opposite the longitudinal tubular section,
the slip swivel further comprising the circumferential groove located adjacent to the proximal end of the slip swivel;
the slip swivel further comprising the circular collar located adjacent to the circumferential groove and spaced from the outer surface of the longitudinal tubular section,
whereby the circumferential channel is formed between the circular collar and the longitudinal tubular section;

the circular collar defining an exterior surface with an annular projection forming a lip around the circular collar at a location between the proximal end of the slip swivel and a terminal edge of the circular collar;

the slip swivel further comprising a plurality of tabs;

wherein the locking ring comprises a circular member with a small diameter segment and a large diameter segment, the large diameter segment defining a plurality of lugs arranged on an interior surface thereof, wherein the plurality of lugs are arranged in pairs, with each pair being located about ninety degrees apart from one another;

wherein each pair of lugs comprises two lugs separated from one another by a space;

wherein each lug includes a leading surface that is angled to form a sloped surface and a trailing surface that is flat and generally perpendicular to the interior surface of the large diameter segment of the locking ring; and wherein the tabs on the circular collar are aligned with the space between the respective pairs of lugs to prevent rotation of the locking ring relative to the slip swivel.

18. The corrugated hose with bayonet connector of claim 1, wherein the locking ring comprises a circular member with a small diameter segment and a large diameter segment, the large diameter segment defining a plurality of lugs arranged on an interior surface thereof, wherein the plurality of lugs are arranged in pairs, with each pair being located about ninety degrees apart from one another;

wherein each pair of lugs comprises two lugs separated from one another by a space, the lugs including a leading surface that is angled to form a sloped surface and a trailing surface that is flat and generally perpendicular to the inner surface of the large diameter segment of the locking ring;

wherein the small diameter segment of the locking ring defines an inward turned rear edge forming an internal lip;

wherein the circumferential ridge forms a first sloped surface that rises upwardly away from the cylindrical section at a first angle to an apex point and a second sloped surface that descends from the apex point back to the cylindrical section at a second angle, wherein the slope of the first sloped surface is steeper than the slope of the second sloped surface; and wherein the internal lip on the locking ring is in contact with the first sloped surface of the circumferential ridge.

19. The corrugated hose with bayonet connector of claim 1, wherein the bayonet coupling comprises a bayonet swivel and a slip swivel, wherein the slip swivel defines the longitudinal tubular section and a proximal end located opposite the longitudinal tubular section, the slip swivel further comprising the circumferential groove located adjacent to the proximal end of the slip swivel;

the slip swivel further comprising the circular collar located adjacent to the circumferential groove and spaced from the outer surface of the longitudinal tubular section, whereby the circumferential channel is formed between the circular collar and the longitudinal tubular section;

the circular collar defining an exterior surface with an annular projection forming a lip around the collar at a location between the proximal end of the slip swivel and a terminal edge of collar, the annular projection forming a sloped surface on a face closest to the terminal edge of the collar and a flat surface on a face closest to the proximal end of the slip swivel;

the flat surface defining an angle of about ninety degrees relative to the exterior surface of the circular collar;

wherein a portion of the cylindrical section of the hose is disposed within the circumferential channel;

wherein the circumferential ridge includes a first sloped surface that rises upwardly away from the cylindrical section at a first angle to an apex point and a second sloped surface that descends from the apex point back to the cylindrical section at a second angle, wherein the slope of the first sloped surface is steeper than the slope of the second sloped surface;

wherein the terminal edge of the circular collar is in contact with the second sloped surface of the circumferential ridge;

wherein the locking ring comprises a circular member with a small diameter segment and a large diameter segment, the large diameter segment including a plurality of lugs arranged on an interior surface thereof, wherein the plurality of lugs are arranged in pairs, with each pair being located about ninety degrees apart from one another;

wherein each pair of lugs comprises two lugs separated from one another by a space, the lugs having a leading surface that is angled to form a sloped surface and a trailing surface that is flat and generally perpendicular to the inner surface of the large diameter segment of the locking ring; and wherein the trailing surface of the lugs is in contact with the flat surface on the annular projection on the circular collar.

20. The corrugated hose with bayonet connector of claim 1, wherein the bayonet coupling comprises a bayonet swivel and a slip swivel, wherein the slip swivel defines the longitudinal tubular section and a proximal end located opposite the longitudinal tubular section;

wherein an annular lip on the bayonet swivel is disposed within the circumferential groove, whereby the bayonet swivel is configured to rotate relative to the slip swivel;

the slip swivel further comprising the circular collar located adjacent to the circumferential groove and spaced from the outer surface of the longitudinal tubular section, whereby the circumferential channel is formed between the circular collar and the longitudinal tubular section;

the circular collar defining an exterior surface with an annular projection forming a lip around the collar at a location between the proximal end of the slip swivel and a terminal edge of collar, the annular projection forming a sloped surface on a face closest to the terminal edge of the collar and a flat surface on a face closest to the proximal end of the slip swivel;

wherein the proximal end of the hose and a portion of the cylindrical section of the hose is disposed within the circumferential channel;

wherein the circumferential ridge defines a first sloped surface that rises upwardly away from the cylindrical section at a first angle to an apex point and a second sloped surface that descends from the apex point back to the cylindrical section at a second angle, wherein the slope of the first sloped surface is steeper than the slope of the second sloped surface;

wherein the terminal edge of the circular collar is in contact with the second sloped surface of the circumferential ridge;

wherein the locking ring comprises a circular member with a small diameter segment and a large diameter segment, the large diameter segment including a plurality of lugs arranged on an interior surface thereof, wherein the plurality of lugs are arranged in pairs, with each pair being located about ninety degrees apart from one another;

wherein each pair of lugs comprises two lugs separated from one another by a space, the lugs defining a leading surface that is angled to form a sloped surface and a trailing surface that is flat and generally perpendicular to the inner surface of the large diameter segment of the locking ring;

wherein the trailing surface of the lugs is in contact with the flat surface on the annular projection on the circular collar;

wherein the small diameter segment of the locking ring defines an inward turned rear edge forming an internal lip;

wherein the internal lip on the locking ring is in contact with the first sloped surface of the circumferential ridge;

wherein the slip swivel further comprises a plurality of tabs located on the external surface of the circular collar, and wherein the tabs are aligned with the space between the respective pairs of lugs to prevent rotation of the locking ring relative to the slip swivel.

* * * * *